(12) United States Patent
Costa

(10) Patent No.: US 9,079,631 B1
(45) Date of Patent: Jul. 14, 2015

(54) MOTORCYCLE FORK ADAPTER

(71) Applicant: Vincenzo Costa, Newport Beach, CA (US)

(72) Inventor: Vincenzo Costa, Newport Beach, CA (US)

(*) Notice: Subject to any disclaimer, the term of this patent is extended or adjusted under 35 U.S.C. 154(b) by 0 days.

(21) Appl. No.: 14/506,905

(22) Filed: Oct. 6, 2014

Related U.S. Application Data

(60) Provisional application No. 62/037,008, filed on Aug. 13, 2014.

(51) Int. Cl.
B62K 25/00 (2006.01)
B62K 21/22 (2006.01)
B62K 21/04 (2006.01)

(52) U.S. Cl.
CPC ................. B62K 21/22 (2013.01); B62K 21/04 (2013.01)

(58) Field of Classification Search
CPC ................................ B62K 21/04; B62K 21/22
See application file for complete search history.

(56) References Cited

U.S. PATENT DOCUMENTS

| 4,565,384 | A  | * | 1/1986  | Dehnisch ................... | 280/279 |
| 7,438,306 | B2 | * | 10/2008 | Mrdeza et al. ............ | 280/279 |
| 7,637,521 | B2 | * | 12/2009 | Grant ....................... | 280/279 |
| 7,938,422 | B2 | * | 5/2011  | Clari ........................ | 280/280 |

* cited by examiner

Primary Examiner — Kevin Hurley
(74) Attorney, Agent, or Firm — Clement Cheng

(57) ABSTRACT

A motorcycle neck adapter comprising a main body formed of a single piece of metal, and a cavity socket formed on an aft end of the main body. The cavity socket is configured to receive an existing motorcycle neck. An upper set screw opening is formed on a top surface of the main body. An upper set screw is installed into the upper set screw opening. The upper set screw is configured to engage an existing motorcycle neck at an existing motorcycle steering neck top opening. The upper set screw is secured to the upper set screw opening by a threaded connection. A lower set screw opening is formed on a bottom surface of the main body. A lower set screw is installed into the lower set screw opening.

13 Claims, 14 Drawing Sheets

MOTORCYCLE FORK ADAPTER

This application is a non-provisional application of and claims priority from U.S. provisional application 62/037,008 by inventor Vince Costa filed Aug. 13, 2014 entitled Motorcycle Fork Adapter, the disclosure of which is incorporated herein by reference.

FIELD OF THE INVENTION

The present invention is in the field of motorcycle fork adapters.

DISCUSSION OF RELATED ART

When customizing a motorcycle front end, the front fork rake angle and other metrics need to be modified to receive a new motorcycle fork. In particular, when adapting to a larger front wheel clearance geometry require moving the neck upwards to clear the wheel. A variety of different motor cycle fork extensions have been implemented, such as U.S. Pat. No. 3,556,557 entitled Motorcycle Fork Extension by inventor R. E. Blair III patented Jan. 19, 1971, the disclosure of which is incorporated herein by reference. Inventor Dehnisch in U.S. Pat. No. 4,565,384 issued Jan. 21, 1986 entitled Motorcycle Fork Tree teaches an adjustable motorcycle fork tree. Additionally, Mrdeza in U.S. Pat. No. 7,438,306 issued Oct. 21, 2008, entitled Motorcycle Rake And Trail Adjuster, the disclosure of which is incorporated herein by reference, provides a motorcycle fork rake extension kit with a securing bolt for clamping the extension portion to the stock portion. The Mrdeza reference requires two separate plates to be clamped to the frame by a through bolt.

A common problem with the prior art bolt on neck rake altering systems is that they lack adequate structural strength. This lack of structural strength has led many within the motorcycle community to avoid these bolt on kits. Instead they would rather go through the tedious and time consuming process of cutting the neck off and welding a new one in place.

SUMMARY OF THE INVENTION

A motorcycle neck adapter comprising a main body formed of a single piece of metal, and a cavity socket formed on an aft end of the main body. The cavity socket is configured to receive an existing motorcycle neck. An upper set screw opening is formed on a top surface of the main body. An upper set screw is installed into the upper set screw opening. The upper set screw is configured to engage an existing motorcycle neck at an existing motorcycle steering neck top opening. The upper set screw is secured to the upper set screw opening by a threaded connection. A lower set screw opening is formed on a bottom surface of the main body. A lower set screw is installed into the lower set screw opening. The lower set screw is configured to engage an existing motorcycle neck at an existing motorcycle steering neck bottom opening. The lower set screw is secured to the lower set screw opening by a threaded connection. An upper bearing mount is formed on the top surface of the main body for receiving an upper tree and a lower bearing mount formed on the bottom surface of the main body for receiving a lower tree in a triple tree configuration.

The one piece construction is possible because the use of set screws to push against the stock neck, as opposed to a central bolt that clamps the neck together. This allows for a very rigid connection.

Optionally, the motorcycle neck adapter can also include a pair of side bolt holes formed through a main body left side and a main body right side of the motorcycle neck adapter to secure the motorcycle neck adapter to an existing motorcycle frame. An upper circlip can be installed into a circlip groove upper formed on the upper set screw opening to retain the upper set screw and a lower circlip can be installed into a circlip groove lower formed on the lower set screw opening to retain the lower set screw. The upper set screw can be recessed into the upper set screw opening, and the lower set screw can be recessed into the lower set screw opening. A steering lock boss can be formed on the main body. A fairing mount can be formed on a front portion of the main body. The frame lock opening can be formed as a first slot. An outer frame opening formed as a second slot.

The following call out list of elements can be a useful guide in referencing the elements of the drawings.

111 Standard Motorcycle Steering Neck
2 Neck Adapter
13 Body Cap
33 Steering Stem
28 Lower Triple Tree
27 Upper Triple Tree
39 Circlip Upper
63 Lock Nut
67 Side Mount Bolt
71 First Slot
72 Second Slot
73 Upper Side Mount Bolt Opening (Side Bolthole)
74 Lower Side Mount Bolt Opening (Side Bolthole)
75 Upper Edge
76 Front Edge
77 Lower Edge
85 Upper Bearing
86 Bearing Race Upper
101 Upper Steering Neck Socket
102 Lower Steering Neck Socket
201 Upper Set Screw
202 Lower Set Screw
61 Top Nut
631 Side Mount Bolt 671 Side Mount Nut
851 Lower Bearing
861 Lower Bearing Race
391 Lower Circlip
239 Circlip Groove Upper
267 Side Bolt Hole
268 Additional Side Bolt Hole
227 Opening For Lower Tree
233 Opening For Steering Tube
286 Opening For Upper Bearing Race (Upper Bearing Mount)
2111 Stock Neck Opening (Cavity Socket)
2112 Outer Frame Stock Bike Opening
2113 Frame Lock Opening
2201 Upper Set Screw Socket (Upper Set Screw Opening)
2202 Lower Set Screw Socket (Lower Set Screw Opening)
2391 Lower Circlip Opening
2201 Upper Set Screw Thread
2301 Fairing Mount
2302 Fairing Mount Hole
2861 Lower Bearing Opening (Lower Bearing Mount)

DETAILED DESCRIPTION OF THE PREFERRED EMBODIMENT

Figure 1:
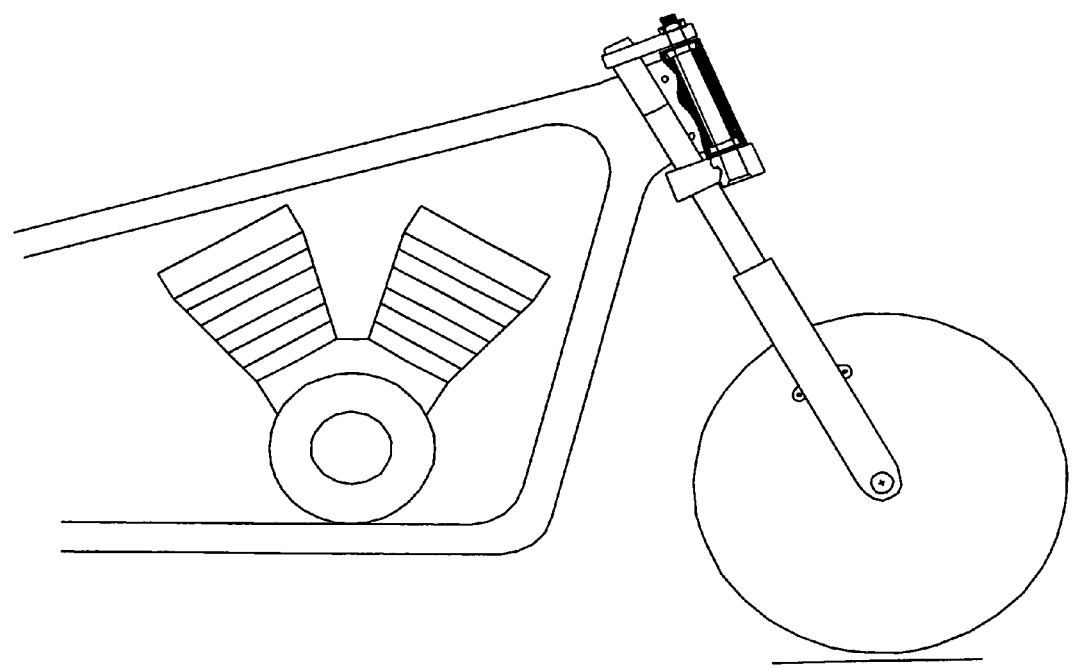
FIG. 1 is a diagram of a stock motorcycle before alteration.
Figure 2:
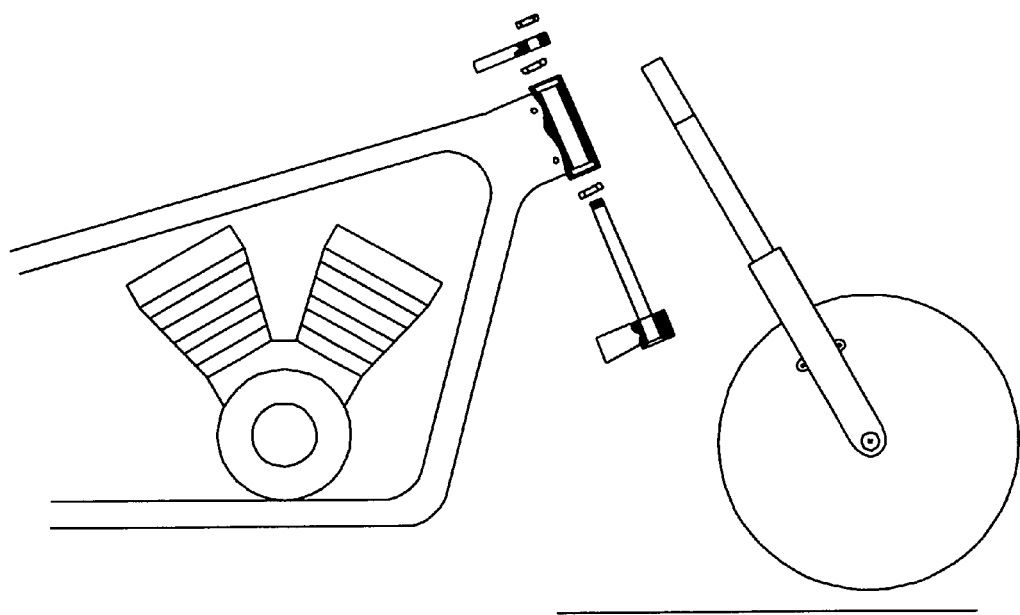
FIG. 2 is a disassembly diagram of removal of trees forks and wheel from a stock motorcycle.
Figure 3:
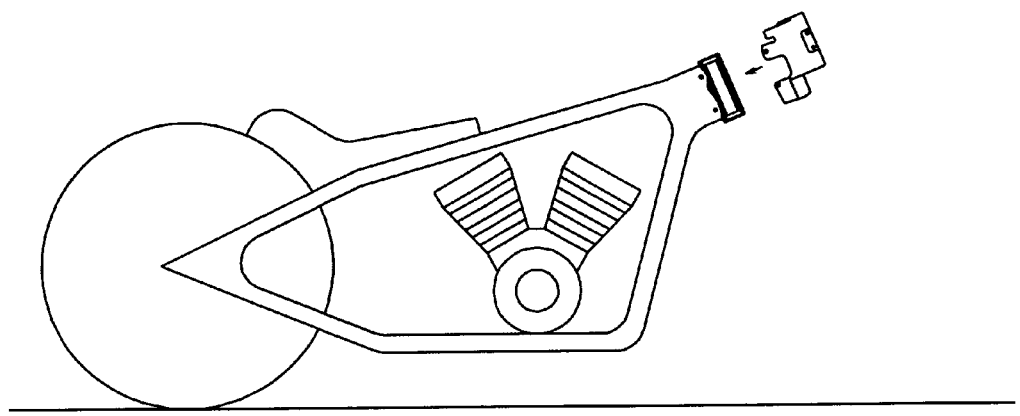
FIG. 3 is an assembly diagram showing a new neck adapter ready to slide in place.
Figure 4:
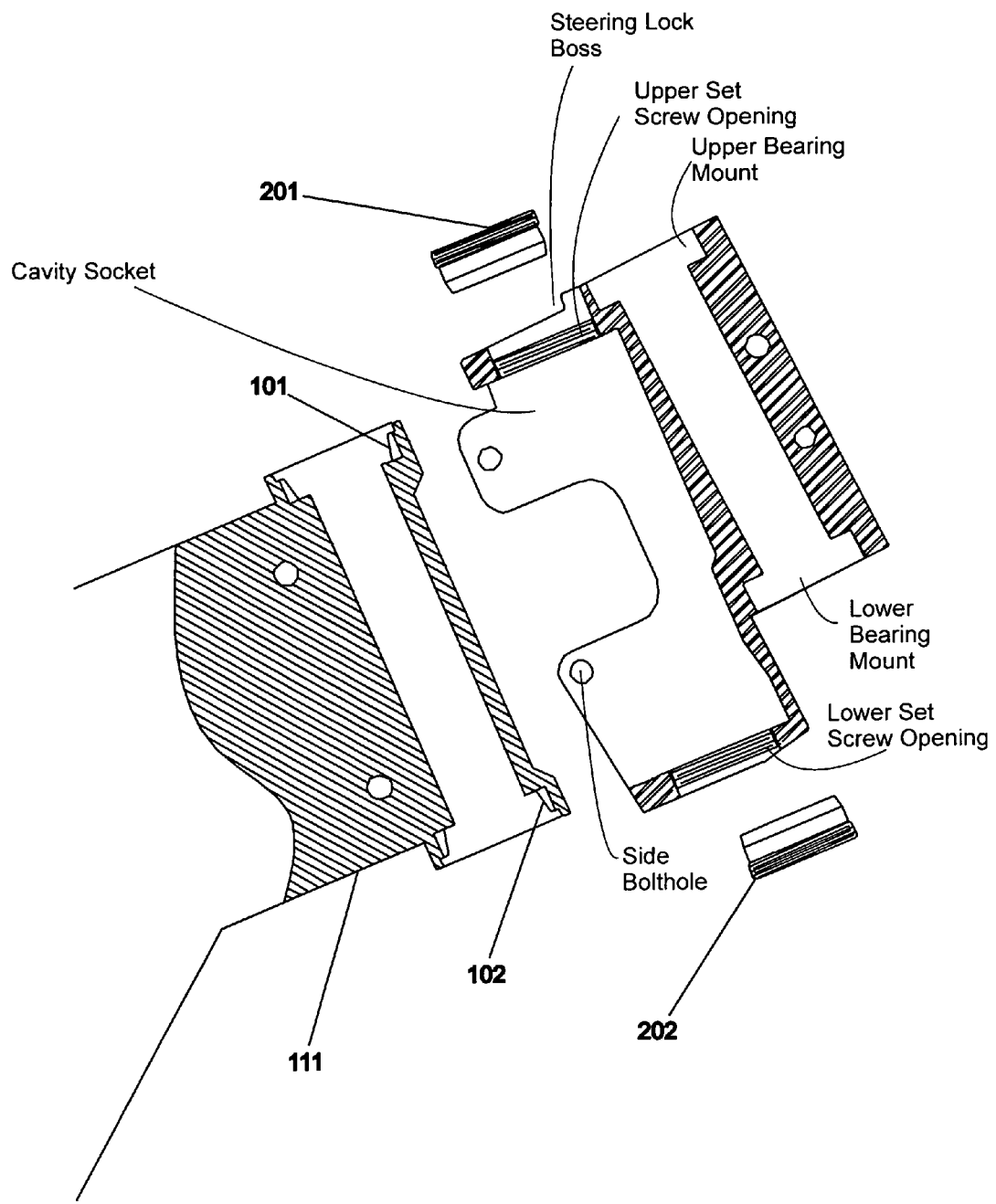
FIG. 4 is an installation diagram showing the installation of the adapter to the stock neck and securing with set screws.
Figure 5:
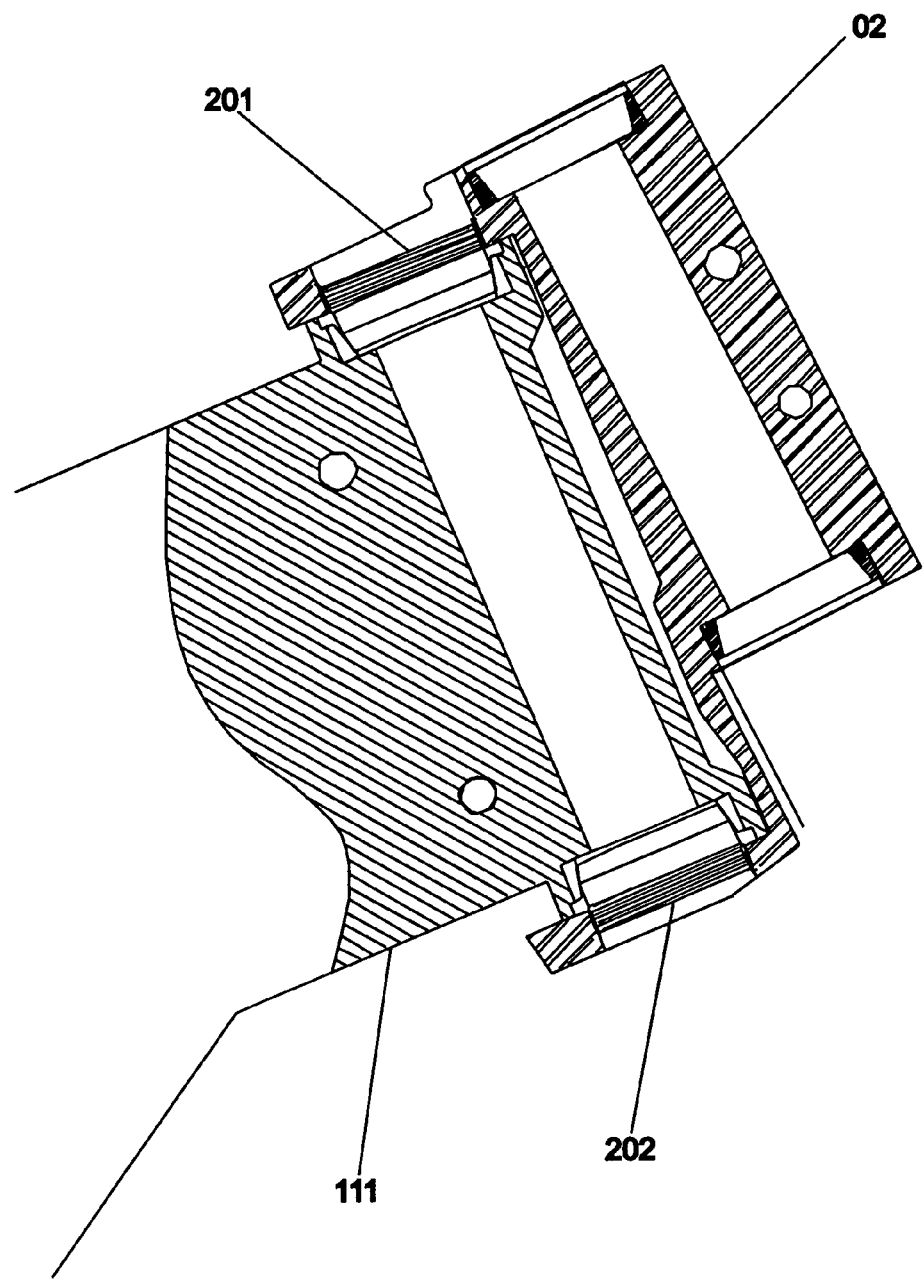
FIG. 5 shows the new neck installed.

A standard motorcycle typically has a front wheel and a rear wheel. The front wheel is retained to the motorcycle by the front fork. The steering neck 111 of the motorcycle in turn retains the front fork assembly. The neck needs to be modified so that a new fork tree can be implemented. The position of the fork is modified by the present invention by a neck adapter that moves the position of the fork assembly from the old steering neck location to a new location. The stock motorcycle typically has a steering axis that has a forward angle. The first step for modifying the stock motorcycle is to remove the trees, steering bearing, fork and wheel from the stock motorcycle. As shown in FIG. 2. The new neck adapter 2 is then installed to the stock neck 111, as shown in FIG. 3. The neck adapter 2 is secured with set screws 201 and 202. The set screws are installed into the old steering head, as shown in FIGS. 4 and 5.

The upper set screw 201 fits into the upper steering neck socket 101 of the stock motorcycle neck 111. The lower set screw 202 fits into the lower steering neck socket 102 of the stock motorcycle. The neck adapter 2 has a slot that allows it to fit onto the stock motorcycle frame. 2111

Figure 6:
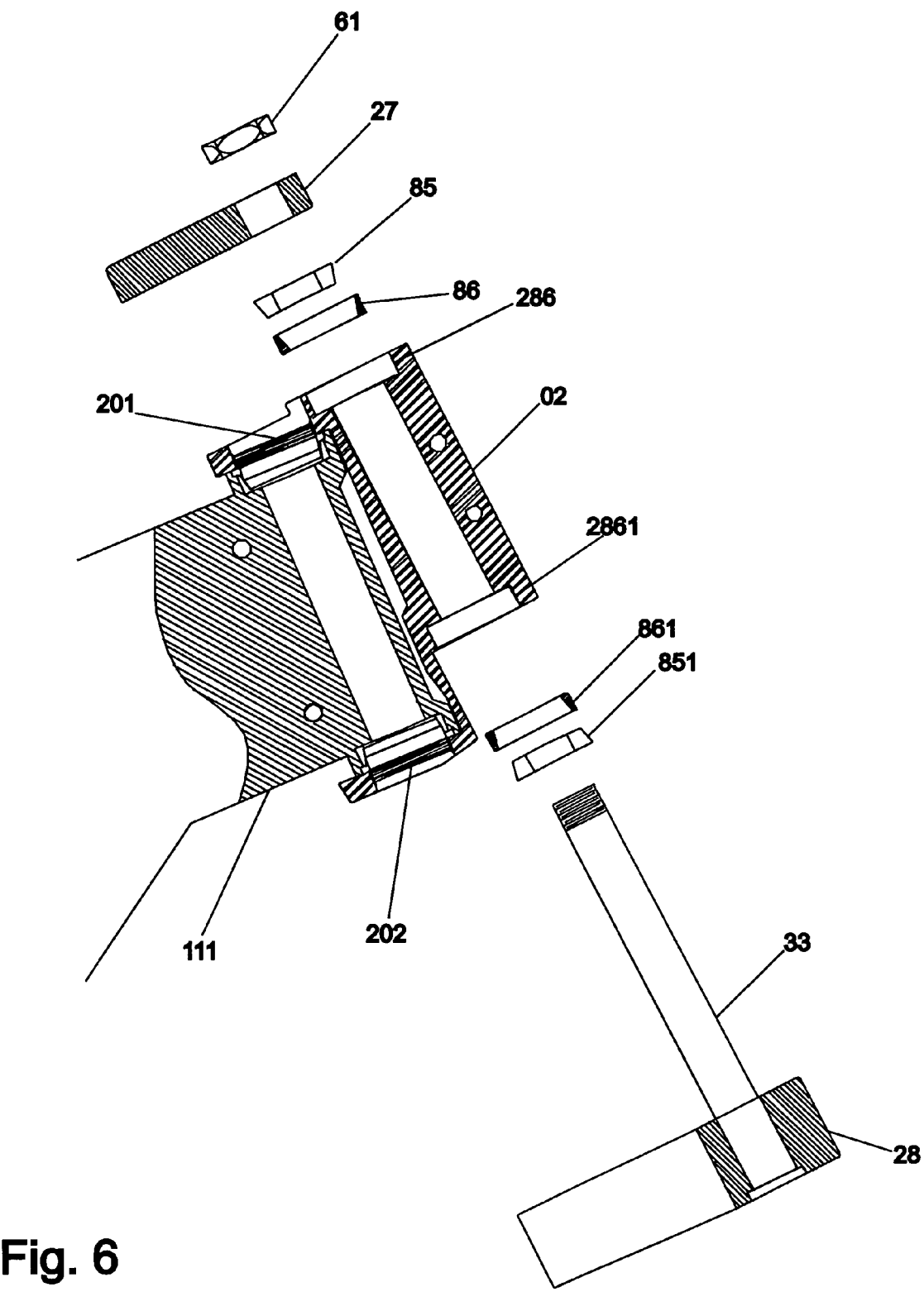
FIG. 6 shows an exploded view of the installed new neck.
Figure 7:
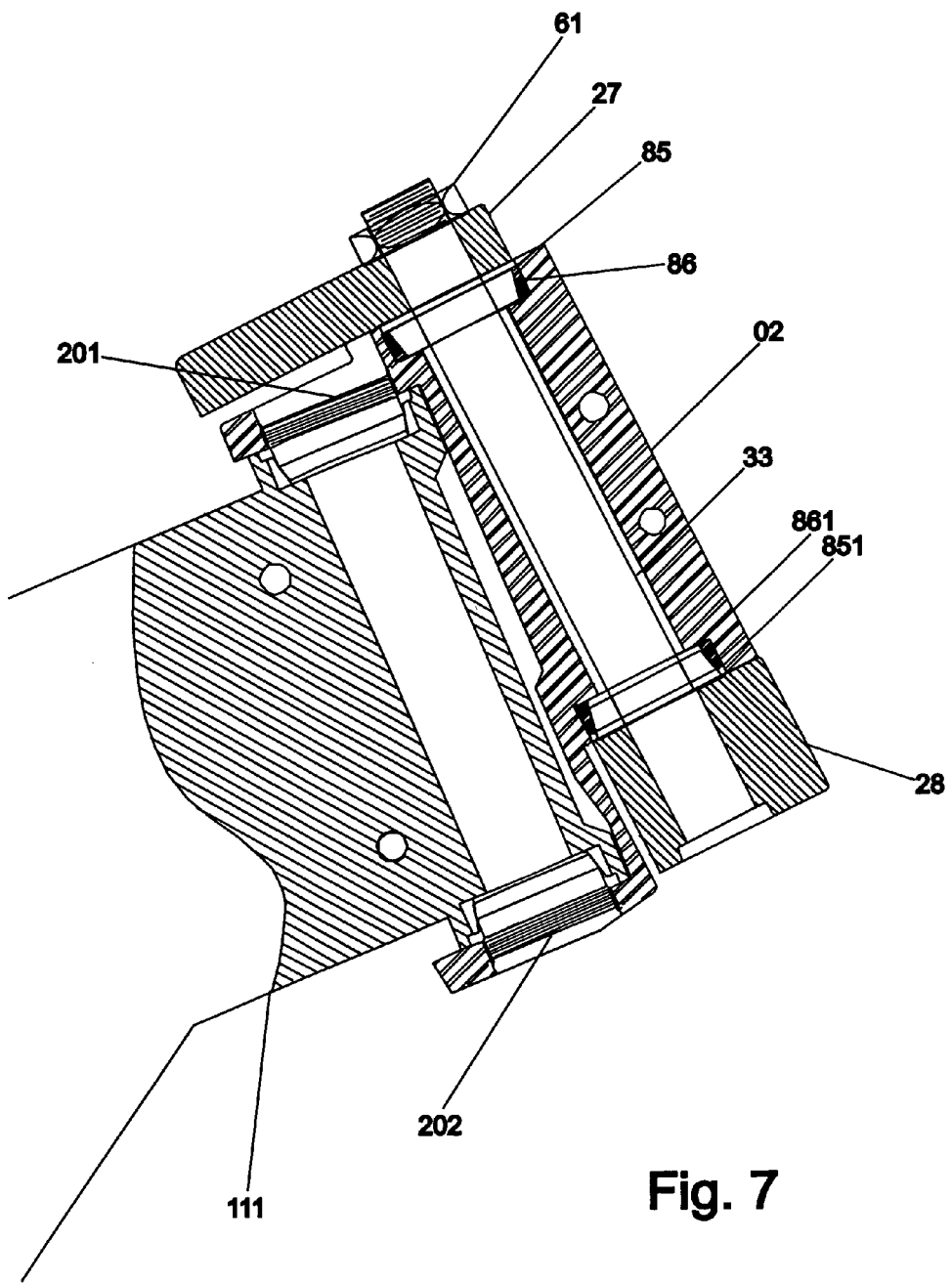
FIG. 7 is a cross-section diagram of the installed new neck.
Figure 8:
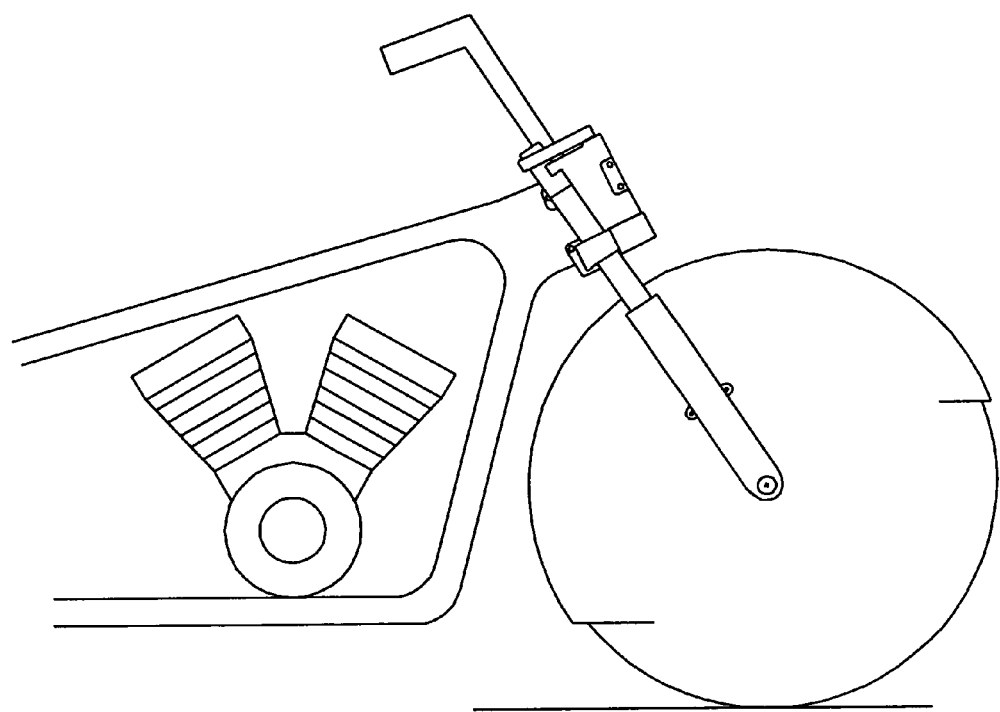
FIG. 8 is a diagram showing a wheel and fork leg installed in trees on the new neck.
Figure 9:
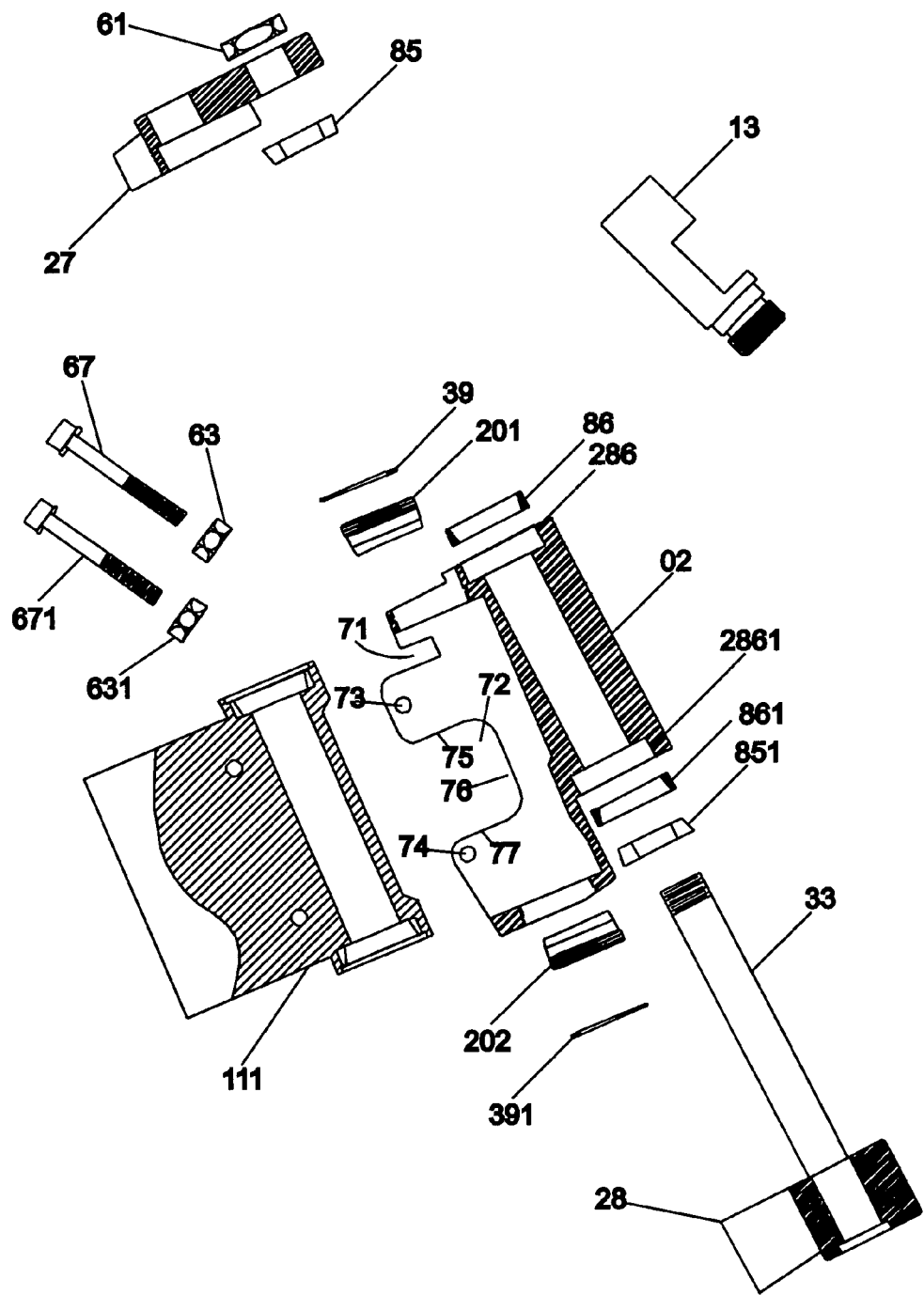
FIG. 9 shows the exploded view of diagram of the preferred embodiment.

The neck adapter 2 is preferably a single block of aluminum billet that has been cut to form a main body of the neck adapter. By forming the neck adapter from a single structure, the possibility of misalignment is greatly reduced. The main body of the neck adapter has a steering tube 233 with a new upper fork bearing race socket 286 and a new lower bearing race socket 2861. After the adapter is fitted over the neck, and the set screws 201 and 202 are secured into place, the top nut (61) secures the steering stem 33 and upper triple tree of the new fork and the upper bearing 85 is retained within an upper bearing race 86 such that the upper bearing 85 and the upper bearing race 86 is installed into the new upper neck socket 286. Similarly, the new lower neck socket 2861 receives a lower bearing race 861 which retains a lower bearing 851. The steering stem 33 connects the lower triple tree 28 to the upper triple tree 27. The steering stem 33 has an upper end that is ready to receive the top nut 61, as shown in FIG. 6.

The neck adapter 2 also has a first slot 71 and second slot 72 cut horizontally across the body of the neck adapter. The neck adapter can be cut from billet aluminum. The first slot 71 can be formed as an outer frame stock bike opening 2112, and the second slot 72 can be formed as a frame lock opening 2113. Alternatively, the first slot 71 can be formed as the frame lock opening 2113, and the second slot 72 can be formed as an outer frame stock bike opening 2112.

The upper set screw socket 2201 and lower set screw socket 2202 preferably include circumferential grooves (239 and 2391) to respectively receive an upper circlip 39 and a lower circlip 391. These circlips prevent vibration driven or accidental backing out of the set screws.

One or more side mount bolts may be used to further secure the assembly to the motorcycle frame. The first side mount bolt 67 is retained by the first lock nut 63 and the second side mount bolt 671 is retained by the second lock nut 631. The first side mount bolt 67, and the second side mount bolt 671 respectively fit into the first side mount bolt opening 267 and the second side mount bolt opening 268. The stock motorcycle frame may have openings that the first side mount bolt 67 and the second side mount bolt 671 can be mounted to. The upper side mount bolt 73 can be formed as the first mount bolt opening 267 and the lower side mount bolt 74 can be formed as second side mount bolt opening 268.

Figure 10:
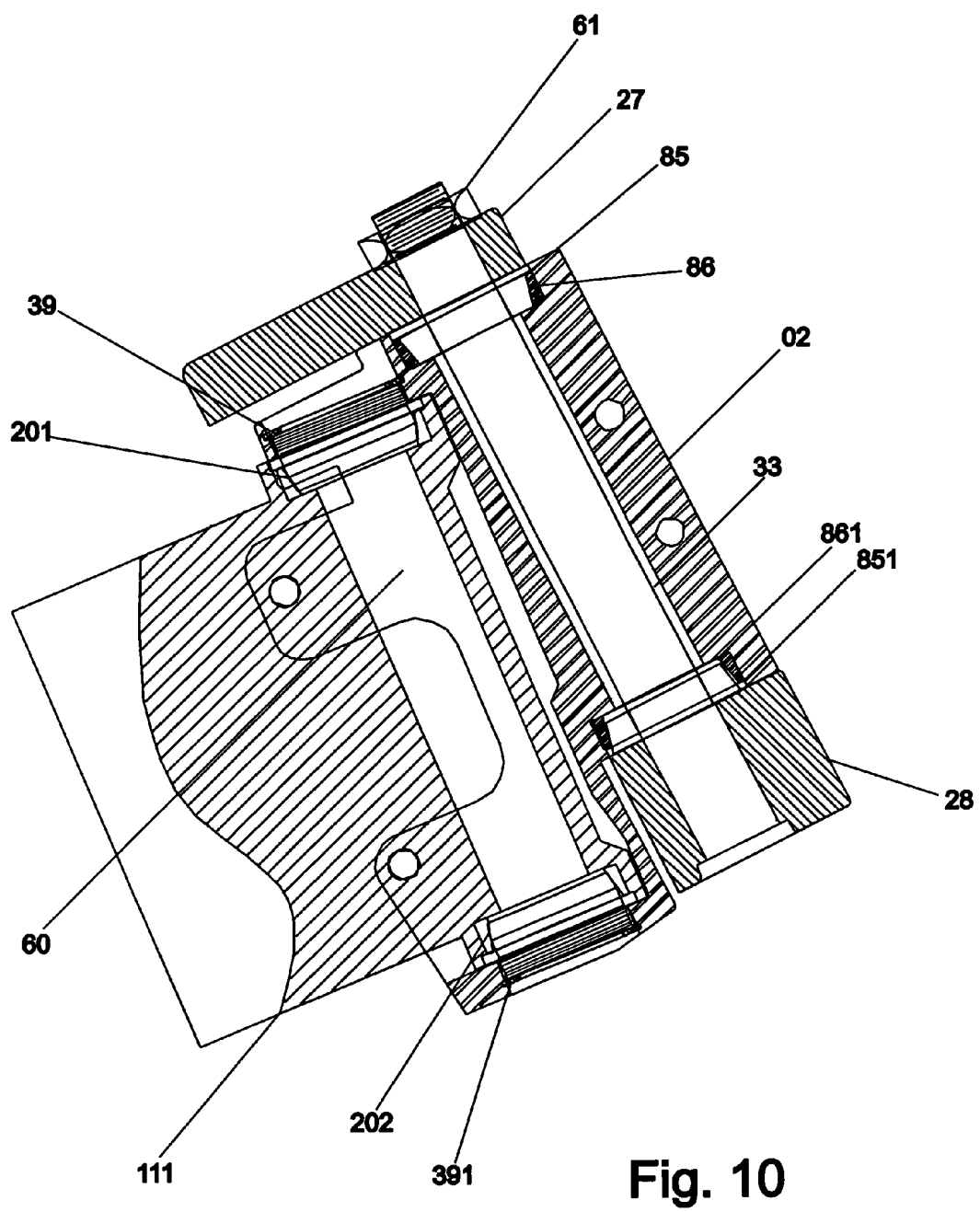
FIG. 10 is an assembled view of the present embodiment in cross-section.
Figure 11:
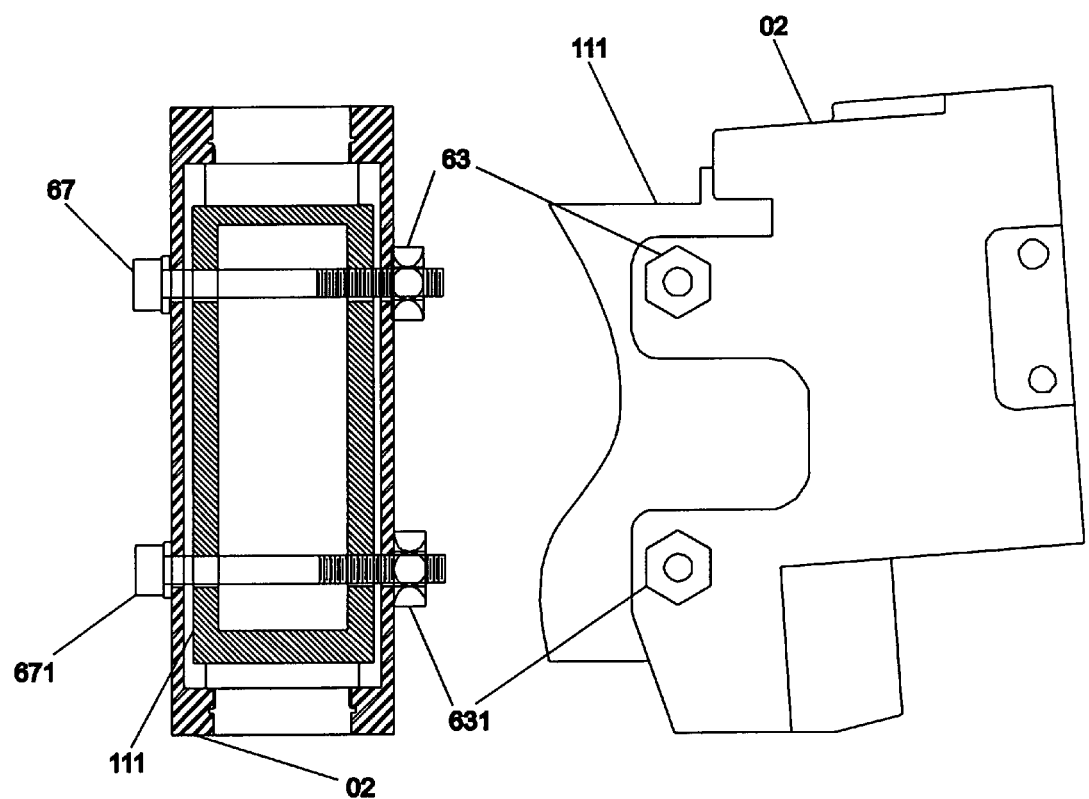
FIG. 11 shows the installation locations of the security bolts.
Figure 12:
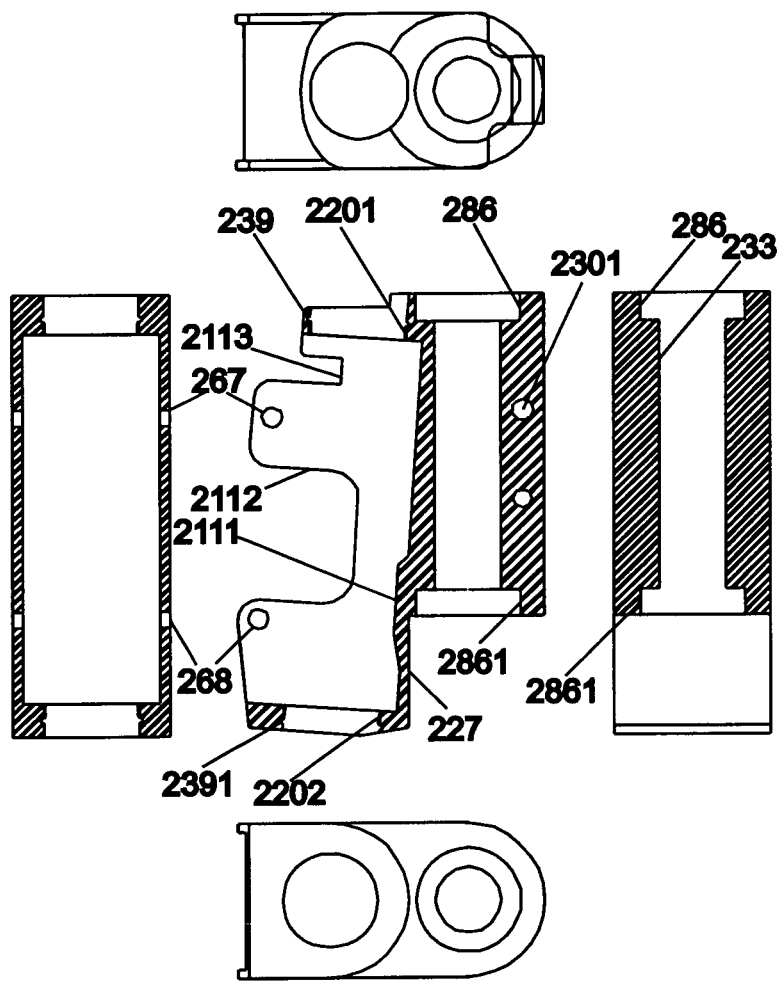
FIG. 12 shows a top, bottom, left, right and cross-section view of the new neck.
Figure 13:
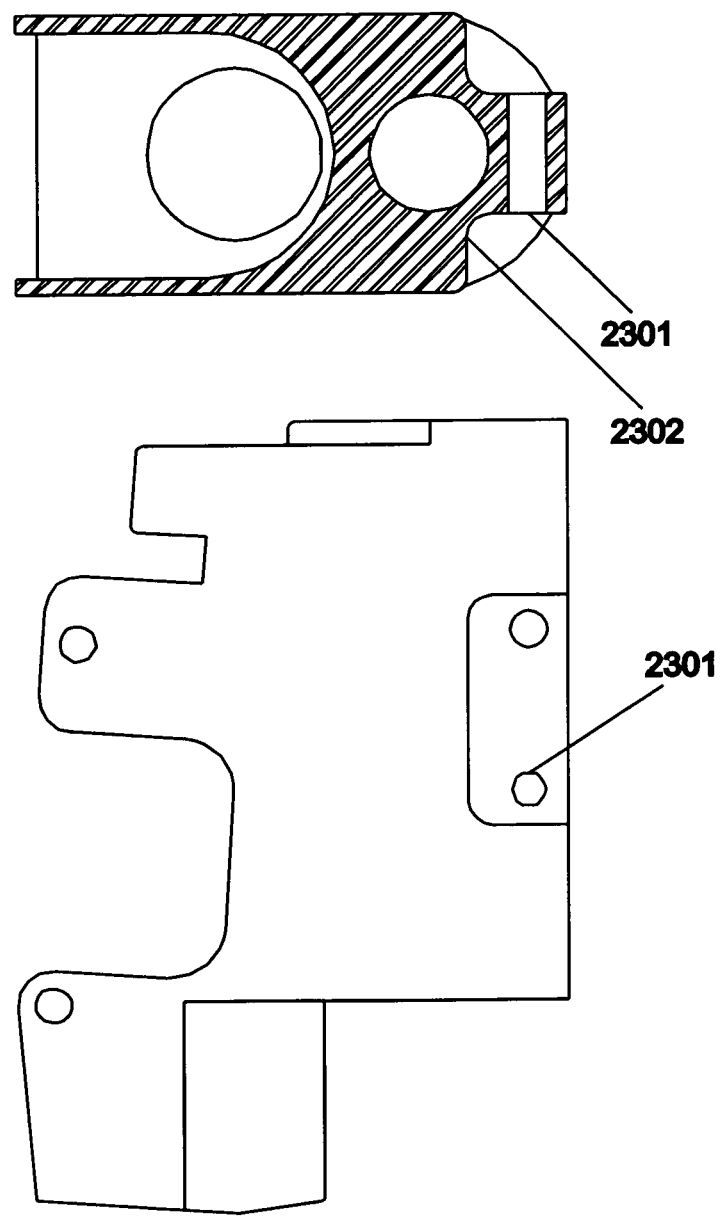
FIG. 13 shows a fairing mount top view and fairing mount side view.
Figure 14:
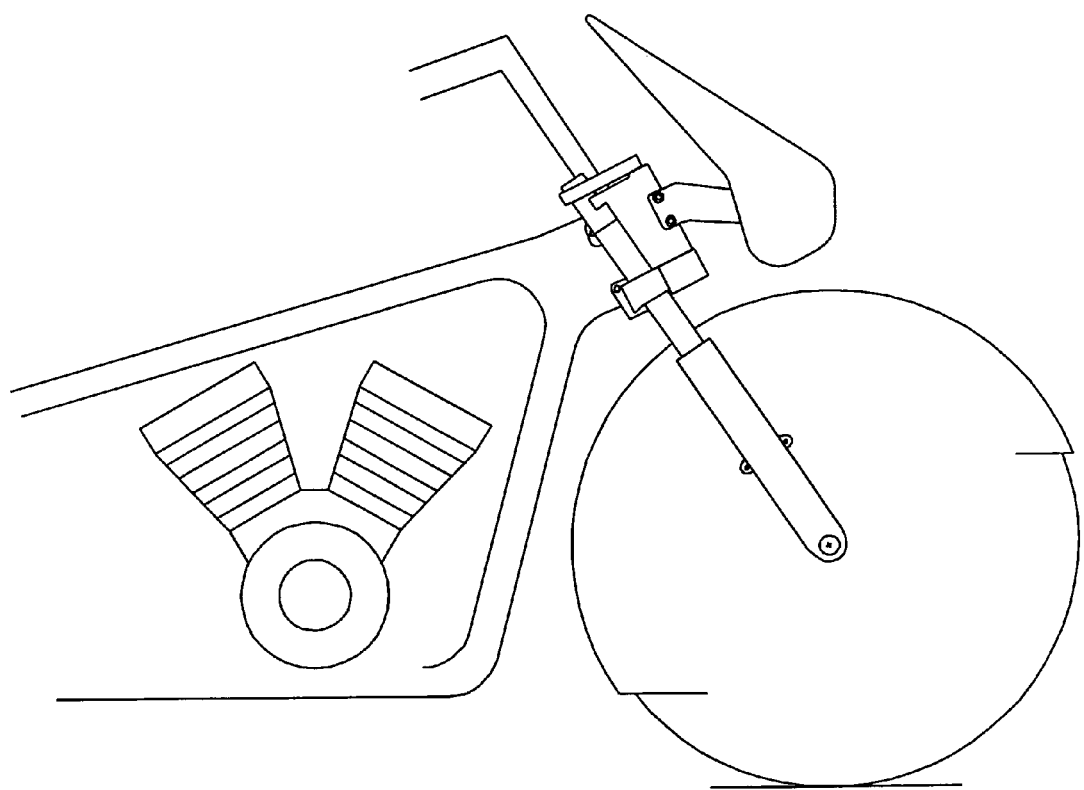
FIG. 14 shows a fairing mounted to the fairing mount.

The second side mount bolt opening 268 is below the second slot 72. The second slot 72 has an upper edge 75, a front edge 76, and a lower edge 77. The second side mount bolt opening 268 is preferably the same size as the first side mount bolt opening 267. The second slot 72 is preferably cut into the body of the neck adapter up to at least the old axis of rotation when seen from a side view such as in FIG. 10. The upper set screw and the lower set screw can be formed as socket caps for capping the old upper and lower sockets. The upper and lower set screws can be retained by circlips.

The neck adapter (2) has an opening to fit the stock neck of the motorcycle 111. This opening which can be called the stock neck opening 2111. The unit may also have an outer frame opening 2112 which can be formed as the second slot. Similarly, the frame lock opening 2113 formed on the new neck can also be formed as an additional slot which can be a first slot. The lower bearing opening 2861 opposes the upper bearing opening 286. Clearance for the lower triple tree 28 may be provided by forming the neck adapter at 227. The position and shapes of the openings 2111, 2112, 2113 are dictated by the shape of the stock motorcycle neck. The openings allow the neck adapter to be easily mounted to the standard motorcycle. Different motorcycles may require different openings to allow fitment of the neck adapter 2.

The fairing mount 2302 has one or more a fairing mount holes 2301 for mounting the fairing to the fairing mount. The fairing mount 2302 is integrally formed with the steering tube. The fairing mount 2301 can be integrally formed with the steering tube.

The neck adapter 2 is preferably made of a single piece cut from billet aluminum and then held in place by the two large set screws 201 and 202. Interior curves can be formed on the inside portion of the neck adapter 2 so that the alternate interior curves match the neck. The set screws 201 and 202, fit into the bearing race so that the stock bearings need not be removed. The neck adapter 2 alters the position of the neck to increase or decrease rake, or to move the neck up or down, or to move the neck forward. The neck adapter 2 may accomplish any one or a several of these alterations to the position of the neck. The circlips prevent the complete extraction or dislodgment of the set screws 201 and 202. Additional stability is provided by the side bolts that tie into the frame. A cavity is formed on the aft end of the one-piece neck adapter 2. The cavity has a shape that is contoured to engage the neck of a stock motorcycle.

The invention claimed is:

1. A motorcycle neck adapter comprising:
   a. a main body formed of a single piece of metal;
   b. a cavity socket formed on an aft end of the main body, wherein the cavity socket is configured to receive an existing motorcycle neck;
   c. an upper set screw opening formed on a top surface of the main body;
   d. an upper set screw installed into the upper set screw opening, wherein the upper set screw is configured to engage an existing motorcycle neck at an existing motorcycle steering neck bottom opening, wherein the upper set screw is secured to the upper set screw opening by a threaded connection;
   e. a lower set screw opening formed on a bottom surface of the main body;
   f. a lower set screw installed into the lower set screw opening, wherein the lower set screw is configured to engage an existing motorcycle neck at an existing motorcycle steering neck top opening, wherein the lower set screw is secured to the lower set screw opening by a threaded connection;
   g. an upper bearing mount formed on the top surface of the main body for receiving an upper tree and a lower bearing mount formed on the bottom surface of the main body for receiving a lower tree in a triple tree configuration.

2. The motorcycle neck adapter of claim 1, wherein a one or more side boltholes are formed through a main body left side and a main body right side of the motorcycle neck adapter to secure the motorcycle neck adapter to an existing motorcycle frame.

3. The motorcycle neck adapter of claim 1, wherein an upper circlip is installed into a circlip groove upper formed on the upper set screw opening to retain the upper set screw and wherein a lower circlip is installed into a circlip groove lower formed on the lower set screw opening to retain the lower set screw.

4. The motorcycle neck adapter of claim 1, wherein the upper set screw is recessed into the upper set screw opening, and wherein the lower set screw is recessed into the lower set screw opening.

5. The motorcycle neck adapter of claim 1, further comprising a steering lock boss formed on the main body.

6. The motorcycle neck adapter of claim 1, further comprising a fairing mount formed on a front portion of the main body.

7. The motorcycle neck adapter of claim 1, further comprising a frame lock opening formed as a first slot.

8. The motorcycle neck adapter of claim 7, further comprising an outer frame opening formed as a second slot.

9. The motorcycle neck adapter of claim 8, wherein a one or more side boltholes are formed through a main body left side and a main body right side of the motorcycle neck adapter to secure the motorcycle neck adapter to an existing motorcycle frame.

10. The motorcycle neck adapter of claim 8, wherein an upper circlip is installed into a circlip groove upper formed on the upper set screw opening to retain the upper set screw and wherein a lower circlip is installed into a circlip groove lower formed on the lower set screw opening to retain the lower set screw.

11. The motorcycle neck adapter of claim 8, wherein the upper set screw is recessed into the upper set screw opening, and wherein the lower set screw is recessed into the lower set screw opening.

12. The motorcycle neck adapter of claim 8, further comprising a steering lock boss formed on the main body.

13. The motorcycle neck adapter of claim 8, further comprising a fairing mount formed on a front portion of the main body.

* * * * *